Sept. 20, 1960  P. GIANOTTO  2,953,698
COMMUTATOR FOR DYNAMO-ELECTRIC MACHINES
AND METHOD OF MANUFACTURING
Filed April 28, 1959  2 Sheets-Sheet 1
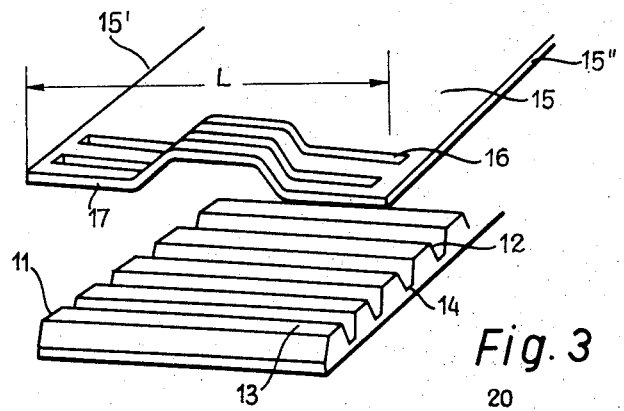
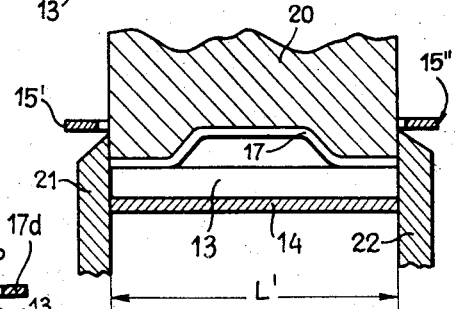
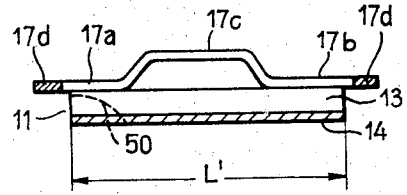
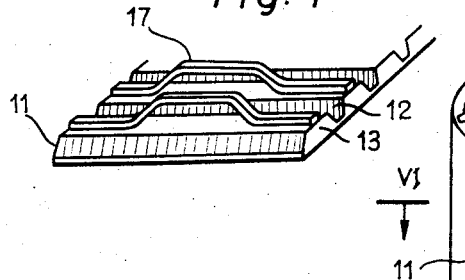
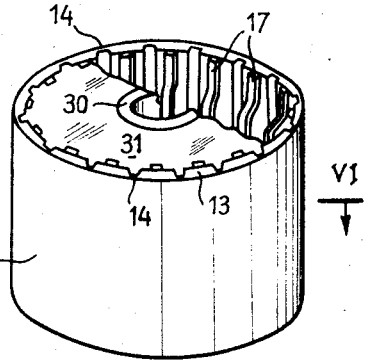

Sept. 20, 1960 P. GIANOTTO 2,953,698
COMMUTATOR FOR DYNAMO-ELECTRIC MACHINES
AND METHOD OF MANUFACTURING
Filed April 28, 1959 2 Sheets-Sheet 2

UNITED STATES PATENT OFFICE 2,953,698
Patented Sept. 20, 1960

2,953,698

COMMUTATOR FOR DYNAMO-ELECTRIC MACHINES AND METHOD OF MANUFACTURING

Pietro Gianotto, Turin, Italy, assignor to Fiat Societa per Azioni, Turin, Italy Filed Apr. 28, 1959, Ser. No. 809,503

Claims priority, application Italy Jan. 19, 1959

7 Claims. (Cl. 310—235)

This invention relates to commutators for dynamo-electric machines, of the type in which the commutator segments are each attached to the periphery of a cylindrical hub of an electrically insulating material.

The manufacture of commutators of this type mostly requires elaborate equipment, considerable work and consumption of material. The main reason for these drawbacks resides in the structure of the attachment means of the individual segments to the insulating material, which is quite elaborate, as well as in the manufacturing method and machinery therefor.

The object of this invention is broadly to provide means for attachment of the segments which will simplify manufacture of the commutator and reduce consumption of valuable metal (copper) without impairing the strength of the commutator against centrifugal force.

According to this invention the means for attachment of the individual segments comprise a metal bridge piece having opposite end sections bonded to the end sections of the segment, and an intermediate section offset towards the axis of the cylindrical hub, the said intermediate section being fully embedded in the insulating material forming the hub.

The bridge pieces are preferably made of a ferrous metal, such as steel, and are preferably bonded to their respective segments by brazing, care being taken to previously coat the bridge pieces by a material adapted to improve bonding, such as bronze.

Figure 6:
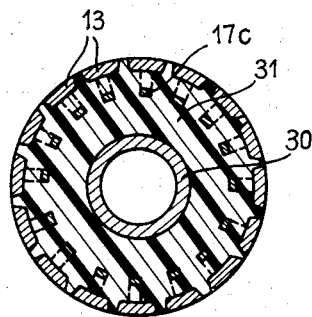
Figure 7:
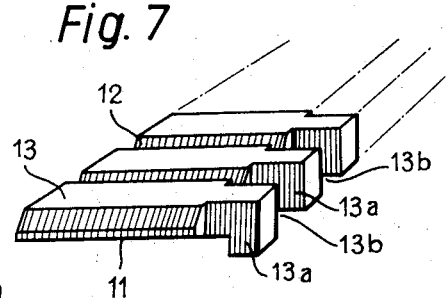
Figure 9:
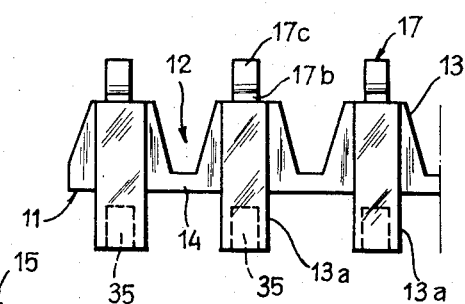
Figure 8:
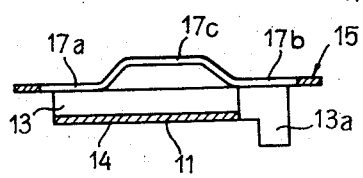
Figure 10:
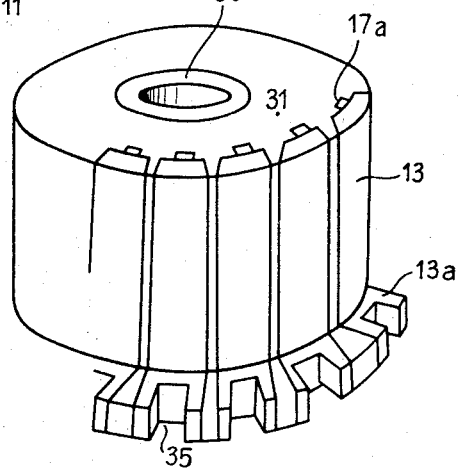

Further characteristic features of the commutator as well as the manufacturing method will be understood from the appended detailed description referring to the accompanying drawing, wherein:

Figure 1 is a perspective view of a set of bridge pieces and a set of segments before interconnection, Figure 2 is a cross-sectional view of the compound segment and bridge piece unit after interconnection, Figure 3 is a similar sectional view showing the step of the manufacturing method at which the set of bridge pieces is severed into separate bridge pieces, Figure 4 is a perspective view of the segment-bridge piece unit resulting from the operational step shown in Figure 3, Figure 5 is a perspective view partly broken away of a raw commutator, Figure 6 is a sectional view on line VI—VI of Figure 5 after removal of a superficial layer from the set of segments for the purpose of electrically separating the segments from one another, Figure 7 is a perspective view of a set of segments which is particularly suitable for strong electric currents, Figure 8 shows the set according to Figure 7 connected with the bridge piece set in a sectional view similar to Figure 2, Figure 9 is a fragmentary end view of the unit according to Figure 8, the bridge pieces having been severed from one another, and Figure 10 is a perspective view of a finished commutator provided with segments according to Figure 7.

In Figures 1 to 6, a set 11 of segments is shown, comprising a rectangular plate of copper, on one planar face of which parallel transverse grooves 12 have been coined to define segments 13 interconnected by thin webs of copper 14 affording continuity of the opposite planar face of the plate 11. The number of segments 13 in this set equals the number of segments in the commutator to be manufactured.

Reference 15 denotes a set of bridge pieces, comprising a rectangular strip of bronze-coated ferrous metal, the width L of which is larger than the width L' of the plate 11. The strip 15 is formed with parallel transverse slots 16 spaced accordingly with the spacing of the segments 13 in the plate 11, the slots 16 ending short before the longitudinal edges 15', 15" of the strip 15. These slots define in the strip 15 bridge pieces 17 equalling in number the segments 13. The bridge pieces are each formed with opposite aligned end sections 17a, 17b and an intermediate bridge section 17c offset with respect to the former in a direction perpendicular to the plane of the strip 15. As will be seen in Figure 2, the overall length of each bridge piece exceeds somewhat the length L' of the segments 13, so that the junctions 17d between the bridge pieces in the strip 15 are located beyond the longitudinal edges of the plate 11, when the strip 15 is superposed on the plate. Moreover, the length of the intermediate bridge section 17c is smaller than L', so that the end sections 17a, 17b of the bridge pieces can be superposed on the respective end sections of the segments 13 as shown in Figure 2. In the conditions shown, a bridge piece 17 is superposed on each segment 13, the bridge pieces being situated, as shown on the drawing, on the grooved face of the plate 11. The resulting compound segment-bridge piece unit is placed in an oven and heated to a temperature and during a period sufficient to cause the end sections 17a, 17b of each bridge piece and their respective segment 13 to become bonded by brazing.

Upon removal from the oven the abovementioned compound unit is processed by a set of tools comprising a punch 20 and a pair of cutters 21, 22. The width of the punch 20 equals the width L' of the plate 11, the mutual spacing of the cutters 21, 22 likewise equalling the value L', so that the combined action of the punch and cutters cuts away from the strip 15 its longitudinal edges 15', 15" including the junctions of the bridge pieces 17. This results in a structure a fragment of which is shown in Figure 4 from which it will be seen that the bridge pieces are separate from one another, and this is the reason for which the length of each bridge piece should equal the segment length L' at least, otherwise the severing step according to Figure 3 would still leave between the individual bridge pieces interconnecting metal zones which would short-circuit the segments in the finished commutator.

The structure according to Figure 4 is now curved to a cylindrical form enclosing the bridge pieces 17, and is placed in a mould of an injection press (not shown). A metal bushing denoted by 30 in Figures 5 and 6 is arranged concentrically with the cylindrical structure in the mould, whereupon a softened insulating material, such as a thermosetting synthetic resin, e.g. phenol-formaldehyde, urea or the like admixed with a suitable filler preferably of a fibrous nature, such as asbestos, glass-wool, cotton fibres or the like, is injected under pressure into the annular clearance between the bushing 30 and cylindrical structure. By effect of pressure the injected material enters the grooves 12 separating the segments as well as the clearances between the bridge section 17c on each bridge piece 17 and its respective segment 13, so that all bridge sections 17c are embedded in the injected material which upon setting forms in turn a hub or drum 31 supporting the set of segments 11 (Figure 5).

The structure shown in Figure 5 is now brought on a lathe, the outer continuous face of the set of segments 11 being cylindrically turned till a sufficient copper thickness is removed to eliminate the webs 14 which still interconnected both mechanically and electrically the segments 13. The resulting commutator is shown in a cross-sectional view in Figure 6, from which it will be seen that the segments 13 are electrically separate from one another, the bridge sections 17c of the bridge pieces being fully embedded in the insulating material forming the hub or drum 31, the said bridge sections being offset towards the commutator axis and electrically insulated from one another.

It should now be recalled that according to the usual technique, a notch should be formed at one end of each commutator segment, adapted to receive the ends of leads pertaining to the rotor winding. Such notch is denoted by a dash-line 50 in Figure 2. These notches may be cut in the finished commutator, such as by placing the commutator on an indexing head and cutting the notches sequentially by means of a simple milling cutter. Alternatively, all the notches 50 can be simultaneously cut in the plate 11 by means of a multiple milling cutter, such as before the operating step shown in Figure 3.

In the embodiment shown in Figures 7–10, in which the same reference numerals as in Figures 1–6 denote equal or equivalent components, the end of each segment 13 in the segment set (plate 11) is formed with a raiser 13a, all raisers 13a being aligned on a longitudinal edge of the plate 11 in a comb-like formation. To form this comb a plate 11 is employed which is of an L-shaped cross section, the said strip being machined on one longitudinal edge by means of a multiple milling cutter which removes material at the zones denoted by 13b in Figure 7, thereby forming the raisers 13a.

This process can be carried out before or after coining the grooves 12 which define the segments 13.

On the plate 11 prepared as above the bridge piece set 15 is superposed and the steps described with reference to Figures 1–6 are performed.

However, in this embodiment the notches adapted to receive the lead ends are cut in the raisers 13a, as indicated by 35 in Figure 10. The notches can be sequentially cut in the finished commutator or simultaneously cut by means of a multiple milling cutter when the segment set is still in its flat configuration, as indicated in Figure 9.

The resulting commutator (Figure 10) has at one end a circumferential crown formed by the raisers 13a. In the radial notches 35 in the raisers 13a the ends of the rotor windings (not shown) of the dynamo-electric machine can be soldered. This embodiment is more particularly suitable, for instance, in connection with electric starting motors for motor vehicle internal combustion engines, in which the leads acting as rotor windings are of a relatively large diameter and have to be most accurately and firmly soldered to the segments 13.

It is assumed that the foregoing description clearly explains all the advantages of this invention as well as all the steps of the manufacturing method.

So, for instance, the quantity of copper necessitated by the structure is minimized because the attachment means 17 can be made of a metal other and less expensive than copper. It should moreover be noted that the thickness of the plate 11 and segments 13 is purposely exaggerated on the drawing for the sake of clearness. Actually, the segment thickness can be conveniently reduced without impairing the efficiency of attachment, especially on considering that the bridge pieces 17 act in this case also as reinforcements for the segments and contribute in electrical conductivity.

The manufacturing method is relatively simple and quick and, what is still more important, does not include any delicate operations entailing risk of waste in manufacture. It does not require special machines either, in that it can be carried out by means of conventional shearing or punching presses, milling machines and presses for moulding plastics.

It will be understood that both the commutator and manufacturing method described herein with reference to the accompanying drawings can be modified in various manners. For instance, bonding by brazing can be replaced by electric seam or spot welding, though brazing has been found more convenient. The ferrous metal of which the bridge piece set is made can, if desired, be plated with a layer of material, such as brass, capable of assuring a strong weld with the segment set. It is not essential for the bridge pieces of the set (strip) 15 to be accurately of the configuration shown and to be initially interconnected at both ends of each bridge piece. In some cases it may be found more convenient to employ a comb-shaped set or strip, wherein the adjacent bridge pieces are mutually connected at one end only. However, it should be borne in mind that the embodiment shown on the drawing appears advantageous when brazing to the plate 11 is adopted, since the end sections 17a, 17b of the bridge pieces are then more safely co-planar with one another.

What I claim is:

1. In a commutator for dynamo-electric machines, comprising individual metal segments attached on the circumference of a drum of insulating material, attachment means for the said segments, each comprising a bridge piece of a metal other than that of the segments having its opposite end sections joined to the end sections of its respective segment, and an intermediate section offset towards the axis of the drum, the said intermediate section being fully embedded in the insulating material constituting the drum.

2. Commutator as claimed in claim 1, wherein the segments are made of copper and the bridge pieces of bronze-coated ferrous metal, the said bridge pieces being brazed to the respective segments.

3. Method of manufacturing a commutator for a dynamo-electric machine, comprising the steps of providing a set of segments arranged in a parallel co-planar relationship, interconnected at one face of the set; providing a set of as many bridge pieces arranged in a parallel relationship interconnected at their ends only, each bridge piece comprising aligned end sections and an intermediate bridge section offset with respect to the plane of the end sections, the length of the intermediate section being smaller than the length of the segments and the overall length of each bridge piece within their interconnecting zones equalling the segment length at least; bonding the set of bridge pieces to the set of segments in a superposed relationship, in which each bridge piece is superposed by its end section on end sections of its respective segment while the interconnecting zones of the bridge pieces are located beyond the set of segments; cutting away the said interconnecting zones of the bridge pieces, curving the resulting composite set to a cylindrical shape enclosing the bridge pieces; pressure injecting an insulating settable material into the space confined by the said cylindrical shape to cause the said bridge sections to be incorporated by the material; and removing from the set of segments a sufficient circumferential layer for electrically separating the segments from one another.

4. Method as claimed in claim 3, in which the set of bridge pieces is made of ferrous metal and is coated by a bronze layer before bonding with the set of segments.

5. Method as claimed in claim 3, in which the set of bridge pieces is joined to the set of segments by brazing.

6. Method as claimed in claim 3, in which the set of segments is L-shaped in cross section, and wherein notches aligned with respective grooves are cut in the angular edge of the set to form on each segment an L-shaped raiser in which a notch is cut for accommodating the ends of associated rotor winding leads.

7. Method as claimed in claim 3, in which the set of bridge pieces is made of a ferrous material plated by a metal material capable of bonding to the metal of which the set of segments is made.

References Cited in the file of this patent

UNITED STATES PATENTS 2,629,064  Lewis _____ Feb. 17, 1953

FOREIGN PATENTS 620,930  Great Britain _____ Apr. 1, 1949
749,911  Germany _____ Dec. 8, 1944